United States Patent
Turgeman et al.

(10) Patent No.: US 10,601,713 B1
(45) Date of Patent: Mar. 24, 2020

(54) METHODS AND NETWORK DEVICE FOR PERFORMING CUT-THROUGH

(71) Applicant: Marvell Israel (M.I.S.L) Ltd., Yokneam (IL)

(72) Inventors: Shira Turgeman, Nirit (IL); Sharon Ulman, Kfar Yehoshua (IL); Rami Zemach, Givat Shapira (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 613 days.

(21) Appl. No.: 14/515,363

(22) Filed: Oct. 15, 2014

Related U.S. Application Data (60) Provisional application No. 61/925,943, filed on Jan. 10, 2014, provisional application No. 61/891,229, filed on Oct. 15, 2013.

(51) Int. Cl.
| | |
|---|---|
| *H04L 12/18* | (2006.01) |
| *H04L 12/801* | (2013.01) |
| *H04L 12/863* | (2013.01) |

(52) U.S. Cl.
CPC ............. *H04L 47/12* (2013.01); *H04L 47/62* (2013.01)

(58) Field of Classification Search
CPC ........................................................ H04L 47/12
See application file for complete search history.

(56) References Cited

U.S. PATENT DOCUMENTS

| | | | |
|---|---|---|---|
| 5,140,583 A | 8/1992 | May et al. | |
| 5,491,687 A | 2/1996 | Christensen et al. | |
| 6,144,668 A | 11/2000 | Bass et al. | |
| 6,625,159 B1 * | 9/2003 | Singh ................... | H04L 49/103 370/235 |
| 7,826,470 B1 * | 11/2010 | Aloni ..................... | H04L 49/90 370/419 |
| 8,379,658 B2 * | 2/2013 | Schmidt .................. | H04L 49/30 370/231 |
| 9,641,465 B1 * | 5/2017 | Gabbay ................... | H04L 49/90 |
| 2003/0026206 A1 | 2/2003 | Mullendore et al. | |
| 2006/0218199 A1 | 9/2006 | Kishi | |
| 2009/0067431 A1 * | 3/2009 | Huang .................... | H04L 49/90 370/394 |
| 2010/0124234 A1 * | 5/2010 | Post ....................... | H04L 47/29 370/412 |
| 2011/0010471 A1 * | 1/2011 | Heidelberger .......... | G06F 13/28 710/22 |

(Continued)

OTHER PUBLICATIONS

U.S. Appl. No. 61/949,118, filed Mar. 6, 2014.

*Primary Examiner* — Brandon M Renner (57) ABSTRACT

A method for processing network packets in a network device is described. A network packet is stored in a transient buffer as the network packet is being received at an ingress port of the network device. After at least a first portion of the network packet has been received and before the entire network packet has been received: the first portion is processed to identify an egress port of the network device from which the network packet is to be transmitted; a congestion state of the egress port is determined; and the network packet is selectively transferred from the transient buffer to the identified egress port for transmission from the network device or a different action is performed on the network packet, based on the congestion state.

21 Claims, 4 Drawing Sheets

(56) References Cited

U.S. PATENT DOCUMENTS

| | | | |
|---|---|---|---|
| 2011/0040923 A1* | 2/2011 | Ren | H04L 49/90 |
| | | | 711/5 |
| 2012/0155492 A1* | 6/2012 | Abel | H04J 3/1682 |
| | | | 370/474 |
| 2012/0243410 A1* | 9/2012 | Vedula | H04L 41/5025 |
| | | | 370/235 |
| 2012/0281699 A1* | 11/2012 | Jia | H04W 8/005 |
| | | | 370/392 |
| 2013/0142066 A1* | 6/2013 | Yamaguchi | H04L 49/109 |
| | | | 370/252 |
| 2014/0098816 A1* | 4/2014 | Matthews | H04L 49/201 |
| | | | 370/390 |
| 2014/0098818 A1 | 4/2014 | Matthews et al. | |
| 2014/0286351 A1 | 9/2014 | Turgeman et al. | |
| 2014/0286352 A1 | 9/2014 | Turgeman et al. | |

\* cited by examiner

METHODS AND NETWORK DEVICE FOR PERFORMING CUT-THROUGH

CROSS-REFERENCES TO RELATED APPLICATIONS

This application claims the benefit of U.S. Provisional Patent Application No. 61/891,229, entitled "Efficient Packet Memory Architecture Supporting Cut Through," filed on Oct. 15, 2013, and U.S. Provisional Patent Application No. 61/925,943, entitled "Efficient Packet Memory Architecture Supporting Cut Through," filed on Jan. 10, 2014, the disclosures of both of which are incorporated herein by reference in their entireties.

FIELD OF THE DISCLOSURE

The present disclosure is related generally to communication networks and, more particularly, to network devices that process packets with reduced latency.

BACKGROUND

Some types of communications in packet-based networks demand very small latencies in end-to-end transmission time. For some applications, even delays on the order of milliseconds can adversely affect a desired outcome, such as buying or selling a security at a target price. Conventional "store-and-forward" techniques, however, introduce additional latency because the network devices implementing the techniques (e.g., bridge devices) must wait to receive and buffer an entire packet before beginning to forward the packet to a next device. For large packets, this delay can be significant.

One known technique that generally helps to reduce latency is referred to as "cut-through" processing. With cut-through processing, a network device processes a portion (e.g., a header) of a packet, and begins to forward/transmit the packet from a transient buffer to a next device, before the entire packet has been received at the transient buffer and written to a queuing memory.

SUMMARY

In an embodiment, a method for processing network packets in a network device includes storing a network packet in a transient buffer as the network packet is being received at an ingress port of the network device. The method also includes, after at least a first portion of the network packet has been received and before the entire network packet has been received: processing the first portion to identify an egress port of the network device to which the network packet is to be forwarded, determining a congestion state of the identified egress port, and selectively transferring the network packet from the transient buffer to the identified egress port for transmission from the network device or performing a different action on the network packet, based on the congestion state.

In another embodiment, a network device includes a transient buffer configured to store a network packet at least during reception of the network packet via an ingress port. The network device also includes a queuing buffer configured to queue network packets awaiting transmission from the network device and a packet processor configured to identify an egress port for the network packet before the reception of the network packet is complete. The network device also includes a header direct memory access (DMA) device configured to determine a congestion state of the egress port and determine an egress path for the network packet based on the congestion state. The egress path does not include the queuing buffer and is from the transient buffer if the congestion state is below a congestion threshold and includes the queuing buffer if the congestion state is not below the congestion threshold. The network device also includes a queue manager configured to selectively transfer the network packet from the transient buffer to the identified egress port for transmission from the network device or perform a different action on the network packet based on the congestion state.

In yet another embodiment, a method for processing network packets in a network device includes storing a network packet in a transient buffer at least during reception of the network packet at an ingress port. The method includes determining a length of the network packet based on a packet length indicator of the network packet. The method also includes reserving buffer space in the transient buffer for the entire network packet, based on the determined length, before reception of the network packet is complete.

DETAILED DESCRIPTION

While cut-through processing generally reduces latency, conventional cut-through techniques nonetheless suffer from various drawbacks. One such drawback arises from traffic congestion at an egress port from which a packet is to be transmitted. If the egress port has a queue of packets already waiting to be transmitted, a packet selected for cut-through processing (e.g., a cut-through packet) must wait for at least part of the queue to be cleared before the packet can be transmitted, thereby negating some of the benefits of cut-through processing. In some conventional network switches, a large queue length causes a delay in transmitting a cut-through packet because one or more packets in the queue must first be transmitted before the cut-through packet. However, if packets are not promptly transmitted and cleared from the transient buffer, the transient buffer can become full, thereby causing subsequent newly ingressing packets to be dropped.

In embodiments described below, however, a network device (e.g., a bridge, router, switch, or any other suitable network device) determines whether to utilize cut-through processing for a packet based on a congestion state of an egress port to which the packet is to be forwarded. For example, according to an embodiment, cut-through processing is utilized only if the egress port is not congested, whereas "store and forward" processing is utilized if the egress port is congested.

In various embodiments described below, some ingressing network packets are scheduled for transmission to achieve a reduced latency by utilizing cut-through processing. In some embodiments, a network packet is processed either as a "cut-through" packet or as a "store and forward" packet based on a congestion state of an egress port for the network packet. In one such embodiment, the cut-through packet is scheduled for transmission from a transient buffer and not stored in a queuing buffer to avoid additional latency associated with the queuing buffer. Thus, in some embodiments, a first egress path (e.g., a cut-through path) or a second egress path (e.g., a store and forward path) is selected for a packet based on the congestion state of the egress port to which the packet is to be forwarded. In an embodiment, the first egress path (e.g., the cut-through path) involves forwarding a packet directly from a transient buffer (e.g., an ingress buffer) where it is stored during processing, and does not require the packet to be first transferred to a queuing buffer (e.g., an egress buffer) before being transmitted from the network device. On the other hand, in an embodiment, the second egress path (e.g., the store and forward path), involves transferring the packet after processing from the transient buffer to the queuing buffer, and then providing the packet from the queuing buffer to the egress port. Thus, in some embodiments and/or scenarios, the second egress path has a higher latency than the first egress path while offering higher resiliency against dropped packets.

Figure 1:
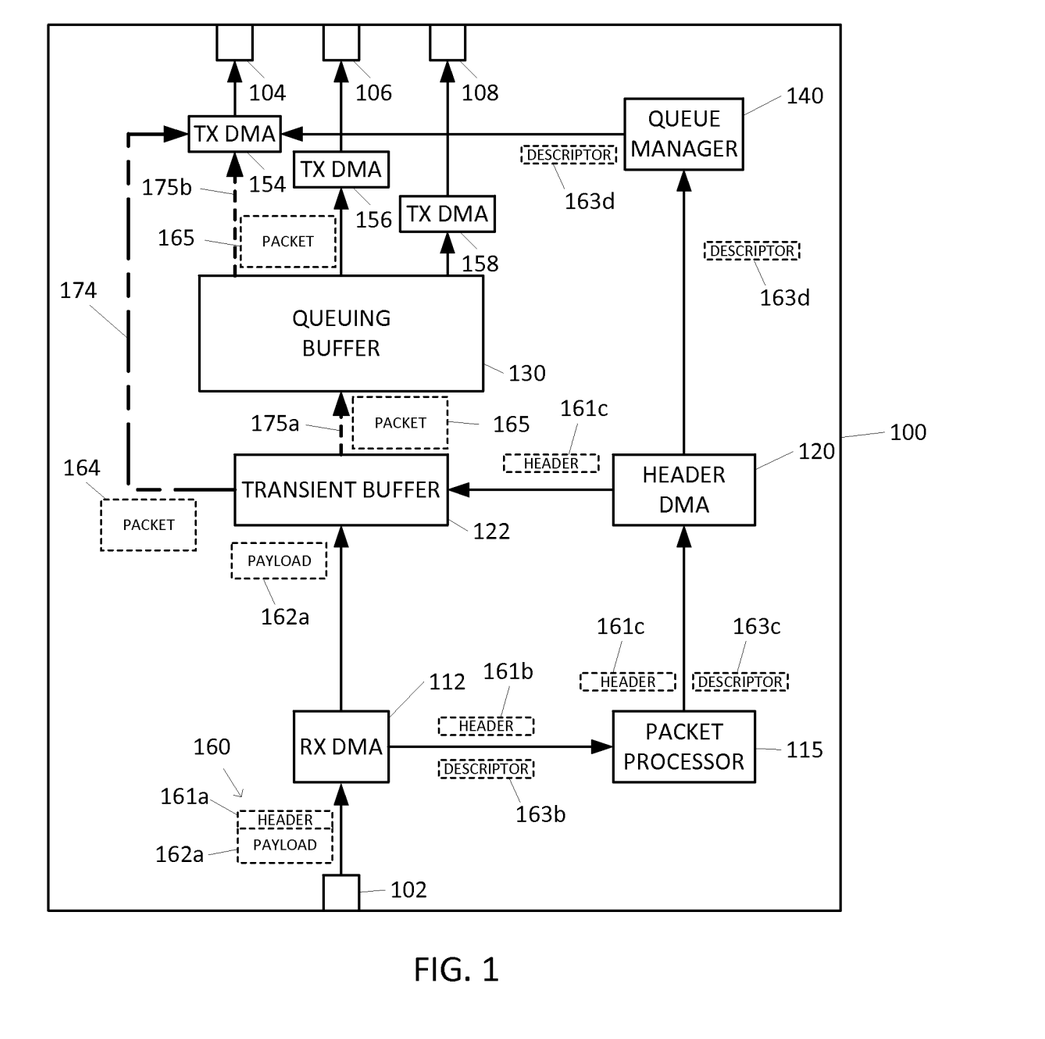
FIG. 1 is a block diagram of an example network device in which network packet processing techniques for unicast packets of the present disclosure are implemented, according to an embodiment.

FIG. 1 is a simplified block diagram of an example network device 100 in which network packet processing techniques for unicast packets of the present disclosure may be implemented, according to an embodiment. The network device 100 is a bridge, router, switch, or any other suitable network device configured to operate within a networked environment, in various embodiments. The network device 100 includes at least ports 102, 104, 106, and 108. In some embodiments, each of ports 102, 104, 106 and 108 is a bidirectional port that can act as either an ingress port or an egress port. In other embodiments, ports are dedicated to be either ingress ports or egress ports. For instance, port 102 is a dedicated ingress port and ports 104, 106 and 108 are dedicated egress ports, in an embodiment. While FIG. 1 only shows four ports, in other embodiments network device 100 includes more than four ports or less than four ports. In various embodiments, network device 100 is configured to handle unicast, multicast and/or broadcast operation. FIG. 1 illustrates an embodiment in which network device 100 is capable of at least unicast operation, and a scenario in which a packet ingresses via port 102 and egresses via at least one of ports 104, 106 and 108 in a unicast manner. It is noted that, in other embodiments and/or scenarios, a packet may instead egress via one port (unicast), via two ports, or via three or more ports.

In the example embodiment of FIG. 1, ingress port 102 is communicatively coupled to a receive-side direct memory access device (RX DMA) 112. RX DMA 112 is configured to write packets received via ingress port 102 to a transient buffer 122, in various embodiments. In some embodiments, the transient buffer 122 stores the packets, or a portion thereof, while a header of the packet, or other suitable data structure representing the packet, is processed (e.g., to determine a target egress port for the packet, perform various operations such as time keeping, perform various security and inspection operations and the like). While the transient buffer 122 as shown in the embodiment of FIG. 1 is dedicated to the port 102, in other embodiments, the transient buffer 122 is shared by one or more additional ports (not shown). In some embodiments, network device 100 includes one or more other RX DMAs coupled to one or more respective ingress ports not shown in FIG. 1. Additionally or alternatively, in some embodiments, RX DMA 112 is a channelized RX DMA associated with a group of two or more ports (that is, ingress port 102 and one or more other ports), where each port within the group is associated with a different DMA context.

The buffer 122 is referred to herein as a "transient buffer" merely because the network device 100 is configured to store packets in the buffer 122 for a relatively short period of time as compared to other packet memories of the network device 100 described below, according to various embodiments. In an embodiment, packets are stored in the transient buffer 122 for a period of time generally corresponding to a period of time required to complete processing of a packet. The transient buffer 122 is implemented as a suitable non-transitory memory device such as a random access memory (RAM), or another suitable type of memory, in various embodiments.

In the embodiment shown in FIG. 1, RX DMA 112 also extracts headers from packets received via ingress port 102, generates a descriptor corresponding to the packets and containing header and other information required for processing, and passes each descriptor to a packet processor 115. In other embodiments, however, a separate unit of network device 100 not shown in FIG. 1 (e.g., a unit disposed between RX DMA 112 and packet processor 115, or within a pipeline, parallel, or other architecture of packet processor 115) extracts the headers and generates the descriptors. In still other embodiments, RX DMA 112 (or a separate unit of network device 100) provides a portion of each packet (e.g., the packet header or a portion of the packet header) to packet processor 115, or a unit disposed within packet processor 115 extracts the different portion of each packet. For ease of explanation and clarity, however, the discussion below will refer to an embodiment in which packet headers are extracted and descriptors are generated by the RX DMA 112 for processing by the packet processor 115.

The RX DMA 112 extracts packet headers from a packet and generates descriptors containing extracted header information and other information, representing the corresponding packets, in an embodiment. Packet processor 115 includes one or more modules for processing the generated descriptors to perform various operations, in some embodiments. Generally, the packet processor 115 (e.g., including a bridging engine, in an embodiment) processes descriptors, and accesses various routing, forwarding and/or other suitable databases stored in a lookup memory (not shown), to perform forwarding operations for the corresponding packets. The arrows in FIG. 1 show a respective path of packet processing for data portions (e.g., packet payload or a data plane) and header portions (e.g., descriptor, packet header or a control plane) of a packet.

Packet processor 115 includes one or more tangible/physical processors. In a first illustrative embodiment, packet processor 115 includes one or more processors configured to read and execute software or firmware instructions stored on a tangible, non-transitory, computer-readable memory (e.g., RAM, read-only memory (ROM), FLASH memory, etc.), the processors being configured to execute the instructions to perform packet processing operations based on a processing context. In some embodiments, the software or firmware instructions include computer-readable instructions that, when executed by the processor(s), cause the processor(s) to perform any of the various actions of packet processor 115 described herein. In one such embodiment, various components are implemented as respective software or firmware modules, with each module corresponding to instructions executed by packet processor 115. In this embodiment, the order of the various components shown in FIG. 1 corresponds only to orders of operation rather than physical location.

In another illustrative embodiment, packet processor 115 is a packet processing pipeline implemented in hardware, such as one or more application-specific integrated circuits (ASICs) or any other suitable type(s) of hardware circuit(s). In one such embodiment, various modules of the packet processor 115 are implemented as respective pipeline stages, respective groupings of pipeline stages, or respective portions of pipeline stages within packet processor 115. In a second embodiment, for example, packet processor 115 is configured to process packets at least partially in parallel.

After being processed by the packet processor 115, each descriptor is sent to a header direct memory access device 120 or other suitable processor. In various embodiments, the header DMA 120 checks a congestion state of one or more target egress ports associated with the descriptor. In some embodiments, such as when the target egress port is suitably free of congestion, the header DMA 120 extracts a processed or modified header from the processed descriptor and stores the processed header in the transient buffer 122, for example, to rejoin the processed header with its corresponding payload. In some scenarios (e.g., for a cut-through packet), the header DMA 120 modifies the descriptor to include a pointer that corresponds to the header and payload stored in the transient buffer 122. In other scenarios (e.g., for a "store and forward" packet), the header DMA 120 modifies the descriptor to include a pointer that corresponds to the header and payload stored in the queuing buffer 130. The header DMA 120 sends the descriptor to a queue manager 140 to be scheduled for transmission, in an embodiment.

The queue manager 140 maintains one or more egress queues (not shown in FIG. 1) that correspond to egress ports, packet flows and/or other suitable targets, and buffers descriptors for the packets that are to be provided to the respective egress port, in an embodiment. In some embodiments, the queue manager 140 schedules the corresponding packets for transmission via the appropriate egress ports. In one such embodiment, packets are transmitted, in the scheduled order, by sending the queued descriptors to respective transmit DMAs 154, 156, 158 of the egress ports associated with the queues. In various embodiments, the queues contain descriptors having pointers to the transient buffer 122 (e.g., for cut-through packets), the queuing buffer 130 (e.g., for store and forward packets), or both (e.g., for multicast packets). In some embodiments, each transmit DMA 154, 156, 158 is associated with a single port. In other embodiments, a channelized transmit DMA is associated with a group of ports, with each port being associated with a DMA context. In an embodiment, the transmit DMAs 154, 156, 158 (channelized or non-channelized) are generally configured to retrieve/read the packets stored in the transient buffer 122 or the queuing buffer 130, and to provide the retrieved packets to a corresponding egress port of network device 100. Although FIG. 1 shows three transmit DMAs (TX DMAs) 154, 156, and 158, that correspond to egress ports 104, 106 and 108, respectively, other suitable numbers of transmit DMAs are utilized in other embodiments.

The queuing buffer 130 is a suitable non-transitory memory device such as a RAM, or any other suitable type of memory device, in various embodiments. The queuing buffer 130 in some embodiments is a high-bandwidth shared packet memory. In some embodiments and/or scenarios, the queuing buffer 130 is shared by the ports of the network device 100 for storing packets to be egressed according to a schedule or queue, for example, when a corresponding target egress port is congested. In one such scenario, a packet to be transmitted via an egress port is stored in a corresponding egress queue of the queuing buffer 130 while another packet is transmitted by the egress port. In this scenario, the egress port is said to be "congested" when packet bandwidth targeting the egress port is greater than the bandwidth provided by the egress port. Thus, not all packets targeted for a given egress port necessarily will be transmitted immediately after they have been processed by the packet processor 115 and header DMA 120, increasing latency of the packets. In various embodiments, the queuing buffer 130 facilitates one or more of complex scheduling, rate limiting, or assembly of packets. In some embodiments, the egress port provides a suitable low latency for egress queues that are filled up to a congestion threshold (e.g., 10 buffered packets, 4096 bytes of buffered data, 2 milliseconds until transmission, 500 linked list entries, or another suitable threshold). A suitable congestion threshold is selected based on transmission speed of the egress port, speed and bandwidth of the transient buffer 122, speed and bandwidth of the queuing buffer 130, or other factors, in various embodiments. In other embodiments, a user or network manager for the network device 100 sets a suitable congestion threshold, which is configurable.

One or more portions of the network device 100 are implemented as hardware (e.g., a hardware processor or memory), one or more processor devices executing firmware and/or software instructions, or any suitable combination thereof, in various embodiments. While only ports 102, 104, 106, and 108, RX DMA 112, packet processor 115, header DMA 120, transient buffer 122, queuing buffer 130, queue manager 140, and TX DMA 154, 156, and 158 are shown for clarity, other embodiments of the network device 100 have a suitable number of additional components or fewer components.

Operation of the network device 100 will now be described in an example context in which a unicast packet 160 is received at ingress port 102. In an embodiment, the packet 160 includes a packet header 161*a* and payload 162*a*. Initially, ingress port 102 begins to receive the packet 160 from a network (e.g., from an egress port of another network device not shown in FIG. 1), and provides the packet 160 to RX DMA 112. In an embodiment, RX DMA 112 writes portions of the packet 160 to transient buffer 122 as those portions are received at ingress port 102, resulting in portions of the packet 160 (including portions of the header 161*a* and payload 162*a*) being stored in transient buffer 122 before the packet 160 has been received in its entirety. Thus, in various embodiments, the RX DMA 112 stores at least the payload 162*a* in the transient buffer 122 as the packet 160 is being received at the ingress port 102. In some embodiments, the header 161*a* is not initially written to the transient buffer 122 by the RX DMA 112, but is instead written to the transient buffer 122 by the packet processor 115 or the header DMA 120 only after processing of the packet by the packet processor 115.

After RX DMA 112 has received at least a first portion of the packet 160 (e.g., the header 161*a* of the packet 160), RX DMA 112 provides the first portion to the packet processor 115. In some embodiments, the RX DMA generates a first descriptor 163*b* or other suitable data structure that corresponds to the packet 160. The first descriptor 163*b* includes at least some information extracted from the first portion of the packet 160, for example, header information and other information (e.g., an identifier of the ingress port 102) necessary for processing the packet 160. In other embodiments, the RX DMA 112 provides a first header copy 161*b* (e.g., a copy of the header 161*a* as received at ingress port 102) to the packet processor 115. In such embodiments, the packet processor 115 generates the first descriptor 163*b* based on the first header copy 161*b*. In one embodiment, the first descriptor 163*b* is, at least initially, merely the first header copy 161*b*. In other embodiments, the first descriptor 163*b* includes, at least initially, only some of the information from the first header copy 161*b*, and/or additional information not included in the first header copy 161*b* (e.g., information to be used only locally, within network device 100, for packet processing). In some embodiments and/or scenarios, the first descriptor 163*b* includes one or more pointers to memory locations within transient buffer 122. In some embodiments, the network device 100 is configured to store an updated or processed header in the transient buffer 122 with buffered portions of the packet 160 using the pointers. In other embodiments, the packet 160 is retrieved for transmission by TX DMAs 154, 156, or 158 using the pointers. In various embodiments, the first descriptor 163*b* includes a low latency flag or other indicator with a value that indicates whether the packet 160 should be handled to provide a low or reduced latency. In some embodiments, the low latency flag indicates whether a data path for the packet 160 (e.g., at least the payload 162*a*) should pass through the queuing buffer 130 or bypass the queuing buffer 130 (thus avoiding or reducing additional latency associated with the queuing buffer 130). The RX DMA 112 sets the low latency flag based on a packet class, packet priority, quality of service level, source address, destination address, or other suitable indicators, in various embodiments.

While ingress port 102 continues to receive the packet 160, and as RX DMA 112 continues to write the packet 160 to transient buffer 122, one or more of the first header copy 161*b* or first descriptor 163*b* is processed by one or more modules within packet processor 115, in an embodiment. In some embodiments, packet processor 115 identifies one or more target egress port(s) to which packet 160 (or a copy thereof) is to be forwarded. In further embodiments, the packet processor 115 also identifies, for packets earmarked for cut-through processing, whether the target egress port is available, and otherwise suitable, for cut-through forwarding. In other embodiments, identification of whether the target egress port is available and otherwise suitable for cut-through forwarding is performed by the header DMA 120. In the scenario of FIG. 1, packet processor 115 identifies port 104 as a target egress port for the packet 160. In an embodiment, identification of whether the target port is available to support a cut-through processed packet includes at least evaluating a congestion status of the target port.

After processing the header 161*b* and/or descriptor 163*b*, the packet processor 115 provides to the header DMA 120 a second header copy 161*c* and/or a second descriptor 163*c* reflecting header alterations made during processing, in various embodiments. In some embodiments, the packet processor 115 modifies the first header copy 161*b* based on the identified target egress port or other processing to generate the second header copy 161*c*. In an embodiment, the packet processor 115 changes a target destination field within the first header copy 161*b* to generate the second header copy 161*c*. In other embodiments, the second header copy 161*c* is simply the unmodified first header copy 161*b*.

In some embodiments, the packet processor 115 determines a congestion state of the target egress port for the packet 160 to determine whether the target egress port is congested or suitable for cut-through processing. In an embodiment, the packet processor 115 sets a congestion flag or other indicator within the second descriptor 163*c* with a value indicating that the target egress port is suitable for cut-through processing.

The header DMA 120 determines a congestion state of the target egress port for the packet 160 to determine whether the target egress port is congested or checks the congestion flag provided by the packet processor 115, in various embodiments. In the scenario illustrated in FIG. 1, the header DMA 120 determines a congestion state for the egress port 104. In some embodiments, the header DMA 120 only checks the congestion state of target egress ports for the packet 160 that have already been determined to be suitable for cut-through processing (e.g., having a suitable operational speed). In various embodiments, the congestion state corresponds to a transmission latency provided for packets transmitted via the corresponding egress port. As described above, at least some egress ports provide a suitable low latency for egress queues that are filled up to a congestion threshold (e.g., 10 buffered packets, 128 kilobytes of buffered data, 2 milliseconds until transmission, 500 linked list entries, or another suitable threshold), in various embodiments. The header DMA 120, or a different unit of network device 100 (not shown in FIG. 1 or FIG. 2), communicates with one or more of the transient buffer 122, the queuing buffer 130, the queue manager 140, or the corresponding TX DMA to determine the congestion state. In an embodiment, the header DMA 120 determines whether an egress port is congested by comparing a congestion state of the target egress port to a congestion threshold.

If it is determined that the target egress port is not congested, a descriptor for the packet is set to indicate the associated packet data is to be transmitted using cut-through processing. For example, the header DMA 120 sets a descriptor 163*d* (e.g., a modified copy of descriptor 163*c*) to include a pointer to the transient buffer 122 for a packet 164 (e.g., a copy of the packet 160 stored in the transient buffer 122) and thus selects a first egress path 174 (cut-through) for packet transmission, in various embodiments. In some embodiments, the header DMA 120 writes the second header copy 161*c* to the transient buffer 122 for the packet 164 upon selection of the first egress path 174 (i.e., for cut-through processing of the packet 160). In an embodiment, when the second header copy 161*c* has a changed target destination field, the second header copy 161*c* is stored in the transient buffer 122 to overwrite the header 161*a*. Accordingly, when the packet 164 is transmitted, the packet 164 includes the updated header 161*c*. In other embodiments, the header 161*a* is not written to the transient buffer 122 and thus the second header copy 161*c* is stored in the transient buffer 122 to complete the packet 164 in the transient buffer 122 (e.g., the second header copy 161*c* and the payload 162*a*). In some embodiments, the packet 164 includes the header 161*c* and payload 162*a* stored as a single block of data within the transient buffer 122. In other embodiments, one or more portions of the packet 164 are stored in separate portions or regions of the transient buffer 122. The header DMA 120 provides the descriptor 163*d* to the queue manager 140, in various embodiments. For example, the header DMA 120 provides the descriptor 163*d* having a pointer to the transient buffer 122 for cut-through processing and having a pointer to the queuing buffer 130 for store and forward processing.

The queue manager 140 schedules the packet 164 for transmission via the target egress port, in an embodiment. In the scenario described above for cut-through processing, the descriptor 163*d* has a pointer to the transient buffer 122 and thus a first egress path 174 from the transient buffer 122 to the TX DMA 154 is used by the TX DMA 154 for cut-through processing and transmission of the packet 164. In some embodiments, the first egress path 174 bypasses the queuing buffer 130 thus avoiding the increased latency inherent in the queuing buffer 130.

When the egress port 104 is ready for transmission of the packet 160 (or a copy thereof), in an embodiment, the queue manager 140 provides the descriptor 163*d* to the TX DMA 154 associated with target egress port 104. In some embodiments for cut-through processing, the packet 164 is selectively transferred via the target egress port 104 (e.g., from the transient buffer 122) before the network packet 160 has been copied to the queuing buffer 130. In such an embodiment, the transient buffer 122 stores the network packet 164 at least until the network packet 164 has been transmitted (if cut-through processing is selected). In one such embodiment, the transient buffer 122 frees the buffer space reserved for the network packet 164 after the packet 164 is transmitted via the egress port.

In some embodiments and/or scenarios, in response to TX DMA 154 scheduling the packet 164 for transmission, the TX DMA 154 begins to provide portions of the packet 164 to egress port 104, for transmission to a destination device, before packet 164 is completely stored in the transient buffer 122 (e.g., before packet 160 has been completely received at ingress port 102 and stored in transient buffer 122). In one embodiment, the TX DMA 154 provides the portions of the packet 164 to egress port 104 substantially as those packet portions become available in transient buffer 122.

On the other hand, if it is determined that the target egress port is congested, a descriptor for the packet is set to indicate the associated packet data is stored in the queuing buffer 130 (e.g., indicating cut-through processing is not to be utilized). For example, the header DMA 120 sets the descriptor 163*d* to include a pointer to associated packet data in the queuing buffer 130, in various embodiments. In some embodiments, the header DMA 120 writes the second header copy 161*c* to the transient buffer 122, as described above. The transient buffer 122 provides the packet 165 (e.g., including the second header copy 161*c* and payload 162*a*) to the queuing buffer 130, in some embodiments. In other embodiments, the header DMA 120 provides the second header copy 161*c* to the queuing buffer 130 and the transient buffer 122 provides the payload 162*a* to the queuing buffer 130.

After the packet 165 has been transferred to the queuing buffer 130, the queue manager 140 schedules the packet 165 for transmission via the target egress port (e.g., port 104), in various embodiments. In some embodiments, the descriptor 163*d* indicates that a second egress path 175 (e.g., not cut-through processing) for the packet 165 has been selected by the header DMA 120. In various embodiments, the descriptor 163*d* has a pointer to the queuing buffer 130 and thus the second egress path 175 (e.g., egress path portions 175*a* and 175*b* through the queuing buffer 130) from the queuing buffer 130 to the TX DMA 154 is used by the TX DMA 154 for forwarding the packet 165 to the egress port 104. In some embodiments, the second egress path 175 includes the queuing buffer 130. When the packet 165 is scheduled for transmission, in an embodiment, the queue manager 140 provides the descriptor 163*d* to the TX DMA 154 associated with target egress port 104.

Thus, by setting the descriptor 163*d* to include either i) the pointer to the packet 164, stored in the transient buffer 122, or ii) the pointer to the packet 165, stored in the queuing buffer 130, the header DMA 120 selects the egress path (e.g., cut through egress path 174 or store and forward egress path 175) for packet transmission, in various embodiments. As described above, the egress path is selected, for example by the header DMA 120, based at least on the congestion state of the egress port, in some embodiments. In various embodiments, selection of the egress path 175 due to congestion triggers the header DMA 120 to cause the transient buffer 122 to copy the received packet 160 to the queuing buffer 130 (e.g., as the packet 165). In other embodiments, the transient buffer 122 copies the received packet 160 to the queuing buffer 130 when either of egress paths 174 or 175 is selected.

Figure 2:
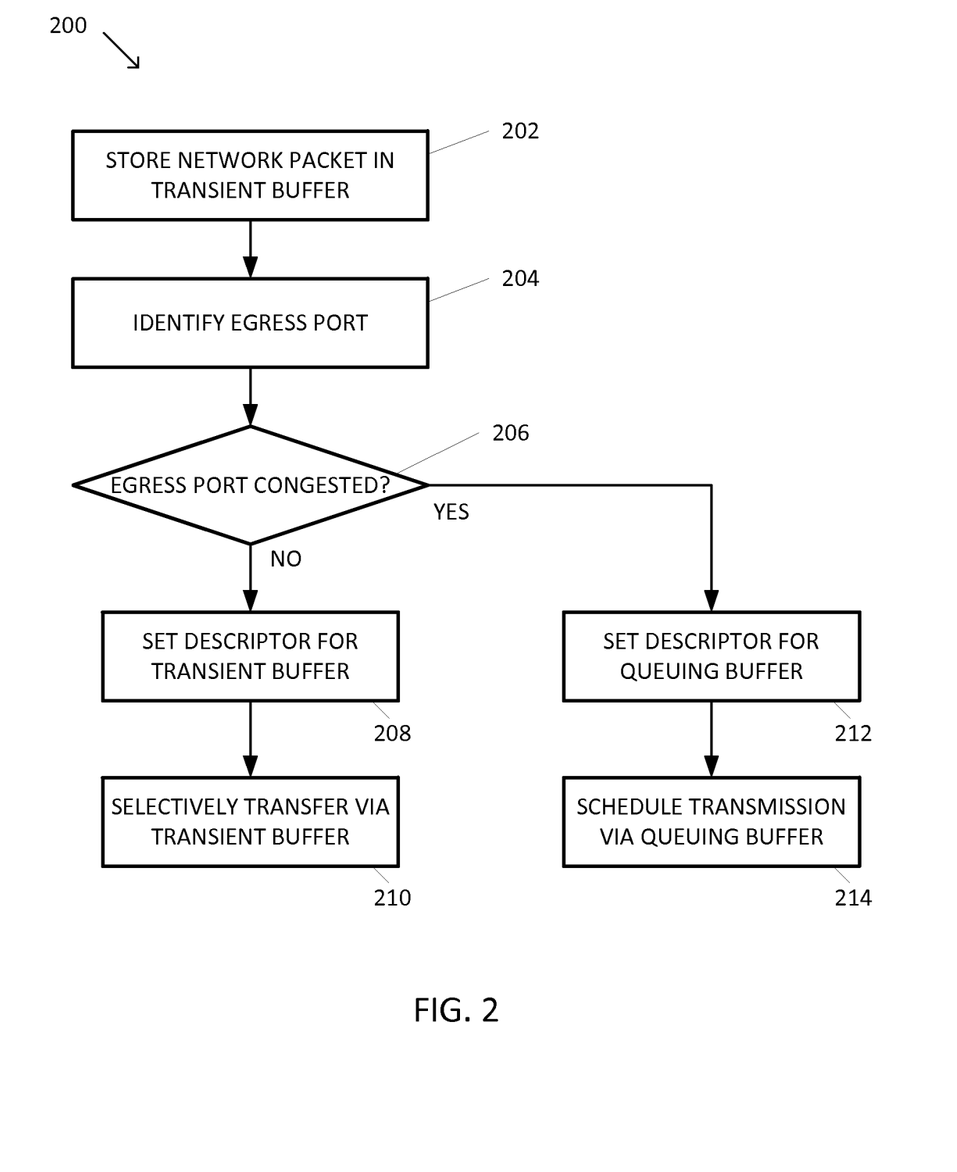
FIG. 2 is a flow diagram illustrating an example method, implemented in a network device coupled to a network, of scheduling network packets for transmission, according to an embodiment.

FIG. 2 is a flow diagram of an example method 200 for processing network packets in a network device, according to an embodiment. In some embodiments, the method 200 is implemented by network device 100 of FIG. 1 or network device 300 of FIG. 3 (described below), and FIG. 2 is described with reference to FIG. 1 for explanatory purposes. In other embodiments, however, the method 200 is implemented by another suitable network device.

At block 202, a network packet is stored in a transient buffer. For example, as noted above, FIG. 1 shows a unicast scenario in which a packet 160 is received by the network device 100 at ingress port 102 and stored in the transient buffer 122.

At block 204, an egress port to which the packet is to be forwarded is identified. For example, as discussed above, the packet processor 115 identifies one or more target egress port(s) to which packet 160 (or a copy thereof) is to be forwarded. In some embodiments, the packet processor 115 also identifies which of those target egress ports, if any, are suitable for cut-through forwarding. In other embodiments, identification of the target egress ports which are suitable for cut-through forwarding is performed by the header DMA 120. In the scenario of FIG. 1, packet processor 115 identifies port 104 as a target egress port for the packet 160. In an embodiment, the packet processor 115 identifies the one or more target egress port(s) based on processing information in a descriptor and/or header associated with the packet.

At block 206, it is determined whether the egress port(s) determined at block 204 is congested. For example, in an embodiment, the header DMA 120 compares a congestion state of the target egress port to a congestion threshold.

If it is determined at block 206 that the target egress port is not congested, the flow proceeds to block 208. For example, it is determined that the target egress port is not congested if the congestion state of the target egress port is below the congestion threshold, according to an embodiment. At block 208, a descriptor for the packet is set to indicate cut-through forwarding is to be utilized. For example, in an embodiment, the descriptor of the packet 165 is set to indicate that associated packet data to be transmitted is in the transient buffer 122. Alternatively, for example, in an embodiment, the descriptor of the packet 165 is set to indicate the egress path 174.

At block 210, the packet is selectively transferred for transmission by reading packet data from the transient buffer 122. For example, the queue manager 140 queues the packet 164 for transmission via the target egress port, in an embodiment. In various embodiments, the descriptor 163*d* has a pointer to the transient buffer 122 and thus the TX DMA 154 utilizes the egress path 174 for forwarding the packet 164 to the egress port 104.

In an embodiment, when the egress port 104 is ready for transmission of the packet 164, the queue manager 140 provides the descriptor 163*d* to the TX DMA 154 associated with target egress port 104. In some embodiments, the TX DMA 154 then begins to provide portions of the packet 164 to egress port 104, for transmission to a destination device, before packet 164 is completely stored in the transient buffer 122 (e.g., before packet 160 has been completely received at ingress port 102 and stored in transient buffer 122).

On the other hand, if it is determined at block 206 that the target egress port is congested, the flow proceeds to block 212. For example, it is determined that the target egress port is congested if the congestion state of the target egress port is not below the congestion threshold. At block 212, a descriptor for the packet is set to indicate the associated packet data to be transmitted is in the queuing buffer. For example, the header DMA 120 sets the descriptor 163*d* to indicate cut-through forwarding is not to be utilized. For example, in an embodiment, the descriptor of the packet 165 is set to indicate associated packet data to be transmitted is in the queuing buffer 130. For example, in an embodiment, the descriptor of the packet 165 is set to indicate the egress path 175.

At block 214, the packet is scheduled for transmission by reading packet data from the queuing buffer 130. For example, the queue manager 140 schedules the packet 165 for transmission via the target egress port (e.g., port 104), in various embodiments. In some embodiments, the descriptor 163*d* indicates the egress path 175 has been selected by the header DMA 120 (e.g., at block 212). In various embodiments, the descriptor 163*d* has a pointer to the queuing buffer 130 and thus the TX DMA 154 utilizes the egress path 175 (e.g., egress path portions 175*a* and 175*b* through the queuing buffer 130) for forwarding the packet 165 to the egress port 104.

Figure 3:
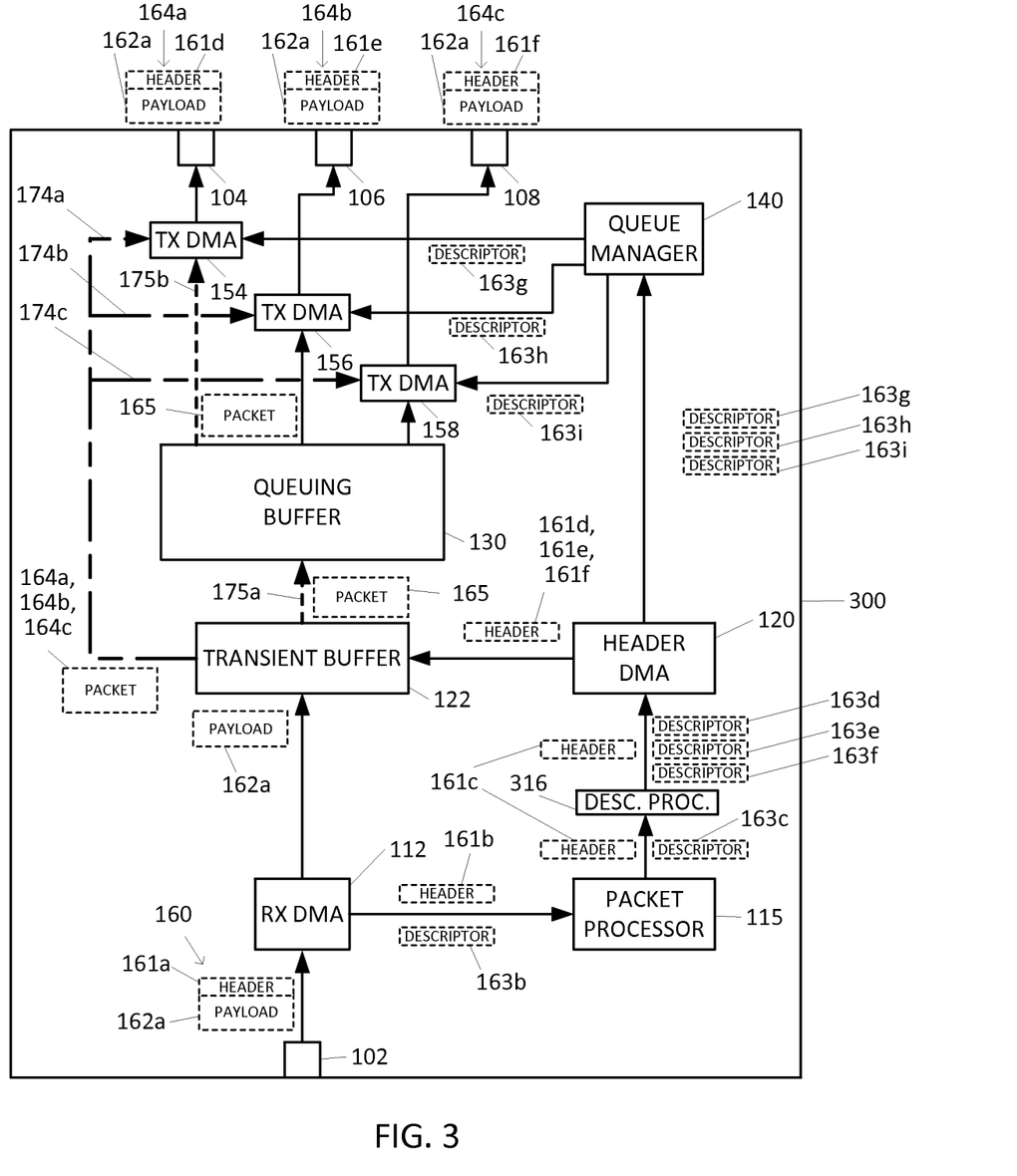
FIG. 3 is a block diagram of another example network device in which network packet processing techniques for multicast packets of the present disclosure are implemented, according to an embodiment.

FIG. 3 is a simplified block diagram of another example network device 300 in which network packet processing techniques for multicast packets of the present disclosure may be implemented, according to an embodiment. In various embodiments, network device 300 is capable of at least unicast operation and multicast operation, and FIG. 3 illustrates a scenario in which a packet ingresses via port 102 and egresses via at least ports 104, 106, and 108 in a multicast manner (e.g., as packets 164*a*, 164*b*, and 164*c*, respectively). In some embodiments, the network device 300 includes ports 102, 104, 106, and 108, RX DMA 112, packet processor 115, header DMA 120, transient buffer 122, queuing buffer 130, queue manager 140, and TX DMA 154, 156, and 158 as shown in FIG. 1 and described above. In various embodiments, the network device 300 also includes a descriptor processor 316 configured to duplicate or copy a descriptor received from the packet processor 115 for additional instances of a multicast packet to be forwarded. In an embodiment, the descriptor processor 316 duplicates a descriptor (or alternatively, generates a new descriptor) that corresponds to a multicast packet. In some embodiments, the descriptor processor 316 creates additional descriptors for target egress ports.

Referring to FIG. 2, in various embodiments and/or scenarios, the packet processor 115 determines that the packet 160 is a multicast packet that should be transmitted via multiple ports. In some embodiments, the packet processor 115 determines whether the packet 160 is a multicast packet or unicast packet based on a multicast header or destination information in the descriptor 163*c* (e.g., a MAC destination address for the packet 160) that corresponds to a multicast group. In the scenario shown in FIG. 2, packet 160 is a multicast packet corresponding to target egress ports 104, 106, and 108. In alternative embodiments/scenarios, the packet processor 115 determines that the packet 160 should be multicast on ports (including ports 104, 106 and 108) other than ingress port 102. The packet processor 115 identifies a plurality of target egress ports from which the network packet is to be transmitted based on the multicast header or destination information, in some embodiments. In the scenario shown in FIG. 2, the descriptor processor 316 generates descriptors 163*d*, 163*e*, and 163*f* for each of the identified target egress ports 104, 106, and 108, respectively, and provides the generated descriptors to the header DMA 120. In some embodiments, the header DMA 120 stores an updated header 161*d*, 161*e*, and 161*f* in the transient buffer 122 for packets 164*a*, 164*b*, and 164*c*, which include copies of the payload 162*a* of packet 160, to be transmitted by the ports 104, 106, and 108, respectively.

In various embodiments, the header DMA 120 determines, or the packet processor 115 provides an indication of, a congestion state for each egress port of the plurality of identified egress ports and determines one or more egress paths (e.g., egress path 174 or egress path 175). In some embodiments, the header DMA 120 generates descriptors 163*g*, 163*h*, and 163*i* (e.g., based on descriptors 163*d*, 163*e*, 163*f*) that include a pointer indicating the selected egress path from the transient buffer 122 (e.g., for cut-through processing) or the queuing buffer 130 (e.g., for store and forward processing). In some embodiments, the header DMA 120 provides the descriptors 163*g*, 163*h*, and 163*i* to the queue manager 140. As described above, the queue manager 140 provides the descriptor to the corresponding TX DMA when the egress port is ready for transmission. As shown in FIG. 2, the descriptors 163*g*, 163*h*, and 163*i* are shown as being provided to the TX DMAs 154, 156, and 158, respectively.

In some embodiments, the header DMA 120 selects an egress path for each egress port to which an instance of the multicast packet is to be forwarded (e.g., as indicated by descriptors 163*g*, 163*h*, 163*i*) separately based on the corresponding congestion state of the egress port. In one scenario, the packet 160 is forwarded via an egress path 174*a* to egress port 104 and forwarded via egress path 175 to egress ports 106 and 108. In this scenario, the packet 160 is stored in both the transient buffer 122 (for example, as packet 164*a* to be transmitted with cut-through processing) and the queuing buffer 130 (as packet 165 to be transmitted with store and forward processing). In other embodiments, the header DMA 120 selects a single egress path for the plurality of egress ports based on the congestion states for the plurality of egress ports. In an embodiment, the header DMA 120 selects egress paths 174*a*, 174*b*, and 174*c* only if each of the plurality of target egress ports for the packet 160 has a congestion state that is below the congestion threshold.

If the egress path 174 (e.g., one or more of 174*a*, 174*b*, or 174*c*) is selected for one or more target egress ports for the packet 160, the header DMA 120 increments a transient counter that indicates a number of queued transient transmissions, in various embodiments. As described above, if the first egress path is selected, the transient buffer 122 stores the network packet 164 at least until the network packet 164 has been transmitted, in some embodiments. Where multiple instances of the network packet 164 must be read from the transient buffer 122, the transient counter is incremented for each instance and thus provides an indication of a remaining number of transmissions to be performed. The header DMA 120, in some embodiments, decrements the transient counter upon a completed transmission of the network packet 164 from the transient buffer 122 to an egress port. In an embodiment, the transient buffer 122 stores the network packet 164 until the transient counter indicates that all queued transient transmissions have been completed (e.g., indicated when the transient counter reaches zero).

In some embodiments, low latency (e.g., cut-through) processing is performed for multicast packets as described above only if the header of the multicast packet need not be substantially changed (e.g., where additional processing time would be needed). In an example scenario, the packet header 161c is modified by the packet processor 115 (e.g., to add a virtual local area network identifier or to indicate tunneling) for an instance corresponding to forwarding to the egress port 102, but the packet header 161c is not modified for an instance corresponding to forwarding to the egress port 104. In such a scenario, the header DMA 120 does not select cut-through processing in order to avoid the increased complexity associated with multiple headers and descriptors for a same payload, according to an embodiment.

Another drawback of conventional cut-through processing is that cut-through packets are allocated buffer space in the transient buffer corresponding to a maximum permissible size. Thus, for cut-through packets having a smaller size than the maximum permissible size, a conventional switch device allocates more buffer space than a minimum amount necessary within the transient buffer in order to accommodate a "worst case scenario". In conventional switches having a shared transient buffer for multiple network ports, a single network port that receives many cut-through packets may be allocated an excessive portion of the transient memory, crowding out the other network ports such that the other network ports cannot store received packets until buffer memory is freed.

Figure 4:
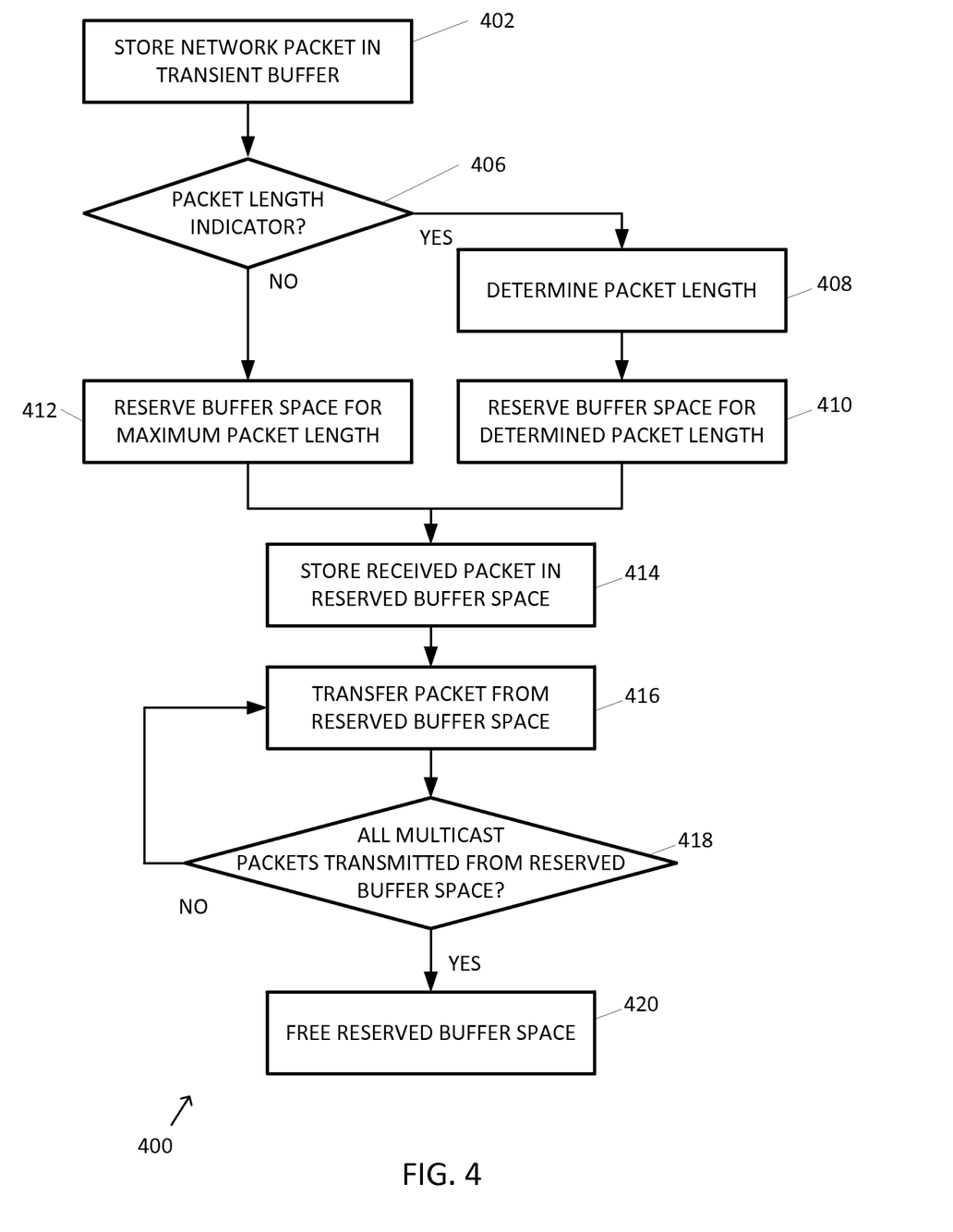
FIG. 4 is a flow diagram illustrating another example method, implemented in a network device coupled to a network, of reserving buffer space for a network packet, according to an embodiment.

FIG. 4 is a flow diagram 400 illustrating another example method, implemented in a network device coupled to a network, of reserving buffer space for a network packet, according to an embodiment. In some embodiments, the method 400 is implemented by network device 100 of FIG. 1 or network device 300 of FIG. 3, and FIG. 4 is described with reference to FIGS. 1 and 2 for explanatory purposes. In other embodiments, however, the method 400 is implemented by another suitable network device.

At block 402, a network packet is stored in a transient buffer as the network packet is received. For example, as noted above, FIGS. 1 and 2 show a packet 160 that is received by the network device 100 at ingress port 102 and stored in the transient buffer 122.

At block 406, it is determined whether a header of the packet includes an indication of a length of the packet. For example, a packet conforming to Internet Protocol (IP) version 4 (IPv4) includes a total length field in a header of the packet. A packet conforming to IP version 6 (IPv6) includes a payload length field. Block 406 includes determining a type of the packet being received at block 406, and determining whether the header of the packet includes a length indicator is determined based on the type of the packet, in an embodiment. For example, some packet types do not include a length indicator in the header of the packet. In an embodiment, determining a type of a packet comprises determining whether the packet conforms to a known communication protocol based on the header of the packet.

If it is determined at block 406 that the header of the packet includes a length indicator, the flow proceeds to block 408. At block 408, a length of the packet is determined based on the packet length indicator in the header of the packet. For example, a length of an IPv4 packet is determined as the value in the total length field in the header, according to an embodiment. As another example, a length of an IPv6 packet is determined as a value indicated by the payload length field plus an additional value of 40 bytes for a fixed-length IPv6 header. Packet lengths of other types of packets are similarly determined based on length indicators in headers of the packets, in some embodiments.

At block 410, an appropriate amount of space in the transient buffer 122 is reserved based on the packet length determined at block 408. For example, the header DMA 120 reserves buffer space in the transient buffer 122 for storing the entire network packet 160 based on the determined length before reception of the network packet 160 is complete, in various embodiments. In some embodiments, reserving space in the transient buffer 122 prevents other processes from using, or other ports from storing received packets in, the reserved space. For example, blocks 406, 408, and 410 are performed prior to the entire packet 160 being received, according to an embodiment.

On the other hand, if it is determined at block 406 that the header of the packet does not include a length indicator, the flow proceeds to block 412. At block 412, a default amount of memory space in the transient buffer is allocated for the packet. For example, the default amount of memory space corresponds to a default packet length, such as maximum packet length (e.g., corresponding to a maximum transmission unit (MTU)) utilized by the network link via which the packet was received, according to an embodiment. The header DMA 120 reserves buffer space corresponding to the default length, according to an embodiment.

At block 414, the RX DMA 112 stores the received packet in the reserved buffer space (e.g., reserved at block 410 or block 412). For example, as additional portions of the packet 160 are received, the additional portions are stored within the reserved buffer space until the packet 160 has been completely stored. At block 416, the packet 160 is transferred from the reserved buffer space. As described above, the transient counter is incremented in some embodiments where a multicast packet (e.g., corresponding to packets 164a, 164b, and 164c) is stored in the transient buffer 122. In such embodiments, the transient counter is decremented at block 416.

At block 418, it is determined whether each multicast packet that corresponds to the packet 160 (e.g., packets 164a, 164b, and 164c stored in the reserved buffer space) has been transferred from the reserved buffer space. In an embodiment, block 416 includes determining whether the transient counter has reached zero, thus indicating that each multicast packet has been transmitted. If it is determined at block 418 that each multicast packet has been transferred, the flow proceeds to block 420. At block 420, the reserved buffer space is freed for use by other ports and/or processes. On the other hand, if it is determined at block 418 that other multicast packets have not yet been transferred, the flow returns to block 416.

In some embodiments, the header DMA 120 selects the second egress path 175 (store and forward path) instead of the first egress path 174 (cut-through path) if a sufficient amount of space cannot be reserved. In some embodiments, the header DMA 120 reserves buffer space in the transient buffer 122 for an ingressing packet and selects a cut-through path for the packet only if a measure of a total amount of buffer space reserved for cut-through packets is below a predetermined threshold, which is configurable in some embodiments. In an embodiment, the measure of the total amount of buffer space is a number of cut-through packets for which memory space in the transient buffer 122 is reserved, and the threshold corresponds to a maximum number of cut-through packets. In another embodiment, the measure of the total amount of buffer space is a cumulative amount of buffer space reserved in the transient buffer 122 for cut-through packets, and the threshold corresponds to a maximum amount of memory space. In some embodiments, different thresholds are utilized for different egress ports to which cut-through packets are to be forwarded. For example, in an embodiment, thresholds corresponding to egress ports with relatively higher speeds may be set to higher values than thresholds corresponding to egress ports with relatively slower speeds. Thus, in one embodiment, a first maximum amount of memory in the transient buffer 122 that can be reserved in connection with a first target egress port with a relatively higher bandwidth may be larger than a second maximum amount of memory in the transient buffer 122 that can be reserved in connection with a second target egress port with a relatively lower bandwidth.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing network packets in a network device, the method comprising:
storing a network packet in a portion of a transient buffer as the network packet is being received at an ingress port of the network device, wherein the transient buffer is configured to store the network packet, or a portion thereof, at least while processing for the network packet is performed;
after at least a first portion of the network packet has been received and before an entirety of the network packet has been received, processing the first portion to identify i) a) whether the network packet is to be handled with cut-through processing or b) whether the network packet is to be handled with store and forward processing, and ii) an egress port of the network device to which the network packet is to be forwarded;
when the cut-through processing is identified for the network packet:
determining whether a congestion state of the identified egress port is below a congestion threshold, and
selecting i) a cut-through egress path for the network packet when the congestion state is below the congestion threshold, including reserving the portion of the transient buffer and storing the network packet in the portion of the transient buffer until the network packet has been transmitted from the egress port, modifying a packet descriptor for the network packet to include a pointer to the reserved portion of the transient buffer, and transferring the network packet from the reserved portion of the transient buffer to the identified egress port for transmission from the network device without storing the network packet in a queuing buffer configured to queue network packets awaiting transmission from the network device, or ii) a store and forward egress path when the congestion state is not below the congestion threshold, including copying the network packet from the portion of the transient buffer to the queuing buffer for queuing before transmission from the network device, and modifying the packet descriptor for the network packet to include a pointer to the queuing buffer to retrieve the network packet for transmission from the network device.

2. The method of claim 1, wherein selecting the cut-through egress path comprises copying a modified header of the network packet to the reserved portion of the transient buffer and transferring the network packet, with the modified header, from the reserved portion of the transient buffer to the identified egress port for transmission from the network device.

3. The method of claim 1, wherein selecting the cut-through egress path comprises transferring the network packet from the reserved portion of the transient buffer before the network packet has been copied to the queuing buffer.

4. The method of claim 1, wherein selecting the cut-through egress path or the store and forward egress path further comprises:
scheduling the network packet for the transmission via the store and forward egress path.

5. The method of claim 1, wherein selecting the cut-through egress path for the network packet comprises bypassing the queuing buffer for transmission of the network packet from the network device.

6. The method of claim 1, wherein determining the congestion state comprises determining a fill level of an egress queue of the queuing buffer that corresponds to the identified egress port.

7. The method of claim 1, wherein the network packet is a multicast packet and the first portion of the network packet includes a multicast header of the multicast network packet, wherein processing the first portion to identify the egress port comprises processing the multicast header to identify a plurality of egress ports from which the multicast network packet is to be transmitted;
wherein determining the congestion state of the identified egress port comprises determining a respective congestion state for each identified egress port of the plurality of identified egress ports;
wherein selecting the cut-through egress path or the store and forward egress path comprises selecting, for each identified egress port of the plurality of identified egress ports, the cut-through egress path or the store and forward egress path, based on the respective congestion state.

8. The method of claim 7, wherein selecting the cut-through egress path or the store and forward egress path comprises:
for each identified egress port of the plurality of identified egress ports,
determining whether the respective congestion state of the identified egress port is below the congestion threshold,
selecting the cut-through egress path when the congestion state of the identified egress port is below the congestion threshold,
incrementing a counter that corresponds to the multicast network packet and indicates a queued transmission of the multicast network packet from the reserved portion of the transient buffer when the cut-through egress path is selected, and
generating an instance of the packet descriptor that corresponds to the multicast network packet and includes a pointer to the reserved portion of the transient buffer.

9. The method of claim 8, wherein transferring the multicast network packet from the reserved portion of the transient buffer comprises transferring the multicast network packet from the reserved portion of the transient buffer for transmission via at least one egress port of the plurality of egress ports before the multicast network packet has been completely received at the ingress port.

10. The method of claim 9, further comprising:
decrementing the counter upon a completed transmission of the multicast network packet from the reserved portion of the transient buffer;
storing the multicast network packet in the reserved portion of the transient buffer until the counter indicates that each queued transmission has been completed;
freeing the reserved portion of the transient buffer when the counter indicates that each queued transmission has been completed.

11. The method of claim 1, wherein storing the network packet comprises:
determining a length of the network packet based on a packet length indicator of the network packet; and
wherein reserving the portion of the transient buffer comprises reserving buffer space in the transient buffer for the entirety of the network packet, based on the determined length, before reception of the network packet is complete.

12. The method of claim 11, wherein determining the length of the network packet comprises determining a packet type of the network packet.

13. The method of claim 12, wherein determining the packet type comprises determining whether the network packet is an Internet Protocol (IP) compliant packet.

14. The method of claim 11, further comprising, determining the length of the network packet as a default length if the network packet does not include the packet length indicator.

15. The method of claim 1, wherein selecting the cut-through egress path comprises:
bypassing the queuing buffer to transfer the network packet directly from the reserved portion of the transient buffer to the egress port.

16. A network device, comprising:
a transient buffer configured to store a network packet, or a portion thereof, at least during reception of the network packet via an ingress port while processing for the network packet is performed;
a queuing buffer configured to queue network packets awaiting transmission from the network device;
a packet processor configured to identify i) a) whether the network packet is to be handled with cut-through processing for transmission of the network packet or b) whether the network packet is to be handled with store and forward processing for transmission of the network packet, and ii) an egress port for the network packet before the reception of the network packet is complete;
a header direct memory access (DMA) device configured to, when the cut-through processing is identified for the network packet, determine whether a congestion state of the identified egress port is below a congestion threshold and i) select a cut-through egress path for the network packet, reserve a portion of the transient buffer at which the network packet was stored during reception of the network packet, store the network packet in the portion of the transient buffer until the network packet has been transmitted from the egress port, and set a packet descriptor for the network packet to include a pointer to the reserved portion of the transient buffer, or ii) select a store and forward egress path for the network packet and set the packet descriptor for the network packet to include a pointer to the queuing buffer, based on the congestion state, wherein the cut-through egress path bypasses the queuing buffer to transfer the network packet directly from the transient buffer to the egress port and is selected if the congestion state is below a congestion threshold, and the store and forward egress path includes the queuing buffer and is selected if the congestion state of the identified egress port is not below the congestion threshold; and
a queue manager configured to i) transfer the network packet from the reserved portion of the transient buffer to the identified egress port for transmission from the network device, or ii) copy the network packet from the transient buffer to the queuing buffer before transmission from the network device, based on the selected egress path.

17. The network device of claim 16, wherein the queue manager is configured to transfer the network packet from the reserved portion of the transient buffer to the identified egress port before the reception of the network packet is complete, if the congestion state is below the congestion threshold.

18. The network device of claim 16, wherein the reserved portion of the transient buffer is configured to store the network packet at least until the network packet has been transmitted when the egress path does not include the queuing buffer and is from the transient buffer.

19. The network device of claim 16, wherein the header DMA device is configured to determine a fill level of an egress queue of the queuing buffer that corresponds to the egress port as the congestion state.

20. The network device of claim 16, wherein the network packet is a multicast packet and the packet processor is configured to identify a plurality of egress ports from which the multicast network packet is to be transmitted, based on a multicast header of the multicast network packet, before the reception of the multicast network packet is complete.

21. The network device of claim 20, further comprising a descriptor processor configured to generate instances of the packet descriptor that correspond to the multicast network packet for each identified egress port of the plurality of identified egress ports from which the multicast network packet is to be transmitted;
wherein for each identified egress port of the plurality of identified egress ports, the header DMA device is configured to
when cut-through processing is identified, determine a congestion state of the identified egress port and select the cut-through egress path or the store and forward egress path for the network packet based on the congestion state of the identified egress port, wherein the cut-through egress path does not include the queuing buffer and is from the reserved portion of the transient buffer and is selected when the congestion state is below the congestion threshold and the store and forward egress path includes the queuing buffer and is selected when the congestion state is not below the congestion threshold,
when the cut-through egress path is selected, increment a counter that corresponds to the multicast network packet and indicates a queued transmission of the multicast network packet from the reserved portion of the transient buffer;
wherein the header DMA device is configured to
decrement the counter upon a completed transmission of the multicast network packet from the transient buffer, and store the multicast network packet in the reserved portion of the transient buffer until the counter indicates that each queued transmission has been completed.

* * * * *